(12) United States Patent
Reding et al.

(10) Patent No.: US 6,328,499 B1
(45) Date of Patent: Dec. 11, 2001

(54) SCREWED CONNECTION FOR THREADED RODS

(75) Inventors: Henri Reding, Marner (LU); Gallus Rehm, Munich (DE)

(73) Assignee: Ares S.A., Grand Duchy of Luxembourg (*) Notice: Subject to any disclaimer, the term of this patent is extended or adjusted under 35 U.S.C. 154(b) by 0 days.

(21) Appl. No.: 09/524,642

(22) Filed: Mar. 14, 2000

(30) Foreign Application Priority Data

Mar. 17, 1999 (LU) .......................................... 90374

(51) Int. Cl.[7] ........................................................ F16D 1/00
(52) U.S. Cl. ........................ 403/299; 403/305; 403/307; 403/368; 403/374.1
(58) Field of Search ...................... 403/300, 301, 403/302, 305, 306, 307, 314, 187, 188, 192, 368, 369, 374.1, 299

(56) References Cited

U.S. PATENT DOCUMENTS

| | | | |
|---|---|---|---|
| 2,679,414 | * | 5/1954 | Hornschuch .......................... 403/307 |
| 3,831,297 | * | 8/1974 | Lanz et al. ............................ 403/368 |
| 4,127,354 | | 11/1978 | Mixon . |
| 4,997,306 | * | 3/1991 | Kunoki ................................. 403/374 |
| 5,606,839 | * | 3/1997 | Baumann ............................. 403/305 |
| 5,746,555 | * | 5/1998 | McEvoy ............................... 403/307 |

FOREIGN PATENT DOCUMENTS

| | | |
|---|---|---|
| 895 952 | 6/1983 | (B) . |
| 16 09 867 | 6/1970 | (DE) . |
| 0 867 578 | 9/1998 | (EP) . |
| 342 078 | 8/1904 | (FR) . |
| 213 333 | 3/1924 | (GB) . |
| 98/10158 | 3/1998 | (WO) . |

* cited by examiner

*Primary Examiner*—Lynne H. Browne
*Assistant Examiner*—Aaron Dunwoody
(74) *Attorney, Agent, or Firm*—Smith, Gambrell & Russell, LLP

(57) ABSTRACT

A screwed connection comprises at least one rod end (10, 12) with an external thread (16) and a threaded sleeve (18) with an internal thread (20). The threaded sleeve (18) is screwed with axial play on to the rod end (10, 12). A cotter (26) is driven through a lateral opening (30) in the threaded sleeve (18) in such a way that it bears on the threaded sleeve (18) and on the end face (22, 24) of the rod end (10, 12) in order to press the external and internal threads (16, 20) axially against each other. A screwed connection of this type is particularly suitable for the production of sleeve connections and end anchorages in the case of reinforcing rods with a rolled-on thread.

21 Claims, 2 Drawing Sheets

SCREWED CONNECTION FOR THREADED RODS

BACKGROUND OF THE INVENTION

The invention relates generally to a screwed connection for threaded rods which is suitable in particular for sleeve connections and end anchorages of reinforcing rods.

About thirty years ago a new connection system for concrete reinforcing rods was put onto the market under the name GEWI® sleeve connection or DYWIDAG® system. A multi-rib reinforcing rod, on which the ribs are rolled in the form of a thread over the full rod length, is used in this connection system. A screwed sleeve connection can be made with a suitably designed threaded sleeve between two GEWI® reinforcing rods cut to length as required.

However, the external thread hot-rolled on to the reinforcing rod can be produced only with relatively rough tolerances. It follows that the sleeve connection is subject to significant axial slip under load. DIN 1045 specifies that the deformation of a screwed sleeve connection (slip at both sleeve ends) under service load occurring in addition to the elastic strain may be at most 0.1 mm.

According to the DYWIDAG® system the required slip limitation is achieved by locking the threaded sleeve at each end by a lock nut. The two lock nuts are tightened by a torque wrench with a locking torque specified as a function of the nominal diameter, so that the screwed connection is prestressed with a predetermined force. Such lock nuts are used in a DYWIDAG® sleeve connection with tensile load or with combined tensile and compressive load. The two lock nuts can be dispensed with in a sleeve connection with exclusive compressive load. The end faces of the two rod ends are then braced against each other in the sleeve, so that the compressive forces are transmitted directly from rod end to rod end.

The two lock nuts increase the cost of the DYWIDAG® screwed sleeve connection and also make it more difficult to produce. In fact the lock nuts are not always easily accessible for the torque wrench, and the torques to be produced are already 950 Nm for a nominal diameter of 28 mm, i.e. at the strength limit of an average worker.

To save the two lock nuts in a screwed sleeve connection WO 98/10158 suggests to eliminate the thread play by pouring cement slurry into the screwed-on threaded sleeve. However, this method is relatively unreliable compared to the DYWIDAG® system with lock nuts. For example, it is not ensured that the thread play is always satisfactorily filled on the construction site.

There is a long felt need for a screwed connection between a rod end with a coarse external thread and a threaded sleeve, which is screwed on to the external thread of the rod end, in which the axial slip caused by the rough tolerances of the outer thread is reduced in an inexpensive and simple, but reliable manner.

SUMMARY OF THE INVENTION

In a screwed connection according to the invention a cotter is driven through a lateral opening in the threaded sleeve in such a way that it bears both on the threaded sleeve and on the rod end face near this opening in order to press the external and internal threads axially against each other by the wedge effect. It should be noted that the cotter can bear on the threaded sleeve or on the rod end face either directly, i.e. by direct contact between cotter and threaded sleeve or cotter and rod end face, or indirectly, i.e. via one or more interposed parts. By driving a wedge essentially at right angles to the longitudinal axis of the threaded sleeve the flanks of the external thread on the rod are pressed with high force against the opposite flanks of the internal thread on the sleeve, so that the screwed connection is reliably prestressed without expensive lock nuts. It should also be noted that when the cotter is driven in, substantially smaller friction resistances have to be surmounted in contrast to tightening of the conventional lock nuts, and also no additional torsional stresses are produced in the connection. To achieve adequate prestressing of the screwed connection the cotter need be driven only a specific length into the threaded sleeve. Less space and less force are required to drive this cotter than to tighten the conventional lock nuts with a torque wrench.

A screwed connection according to the invention is particularly suitable for a sleeve connection between two rod ends with tensile load or combined tensile and compressive load. With such a sleeve connection between two rod ends each of the two screwed connections could, of course, be prestressed individually with a separate cotter. In an advantageous embodiment of such a screwed sleeve connection, however, only a single cotter is required to prestress both screwed connections. The threaded sleeve used for this purpose has a continuous channel with an internal thread, the rod ends to be joined being screwed into the threaded sleeve in such a way that their end faces are axially opposite each other in the threaded sleeve. A single cotter is then driven through the lateral opening of the threaded sleeve between the two rod end faces, wherein it bears on the two opposite end faces in order to press the external thread of the two rod ends axially against the internal thread of the threaded sleeve by the wedge effect and thus prestress both screwed connections at the same time.

A screwed connection according to the invention is likewise highly suitable for securing an end anchorage to a rod end with a rolled-on external thread. A threaded sleeve or cap nut screwed on to the rod end forms the end anchorage. The cotter is driven through a lateral opening in the threaded sleeve or cap nut in such a way that it bears on the rod end face and on the threaded sleeve or cap nut in order to press the external and internal threads axially against each other by the wedge effect and thus prestress the screwed connection.

The cotter is preferably self-locking, so that it need not be secured. It can be designed as a single part, but is preferably a double wedge or even better a triple wedge with parallel supporting surfaces. A triple wedge can, for example, advantageously be designed as a one-piece drive-in dowel. One or more marks on the cotter enable the driving depth to be determined.

The opening for the cotter in the threaded sleeve is advantageously designed as a guide slot, in which the cotter is guided laterally. The threaded sleeve advantageously has at least two openings for the cotter offset in the circumferential direction, so that the cotter can be driven in more easily in different angular positions of the threaded sleeve.

BRIEF DESCRIPTION OF THE DRAWINGS

Preferred embodiments of the invention will be described in detail with reference to the accompanying drawings, in which.

DETAILED DESCRIPTION OF PREFERRED EMBODIMENTS

Figure 1:
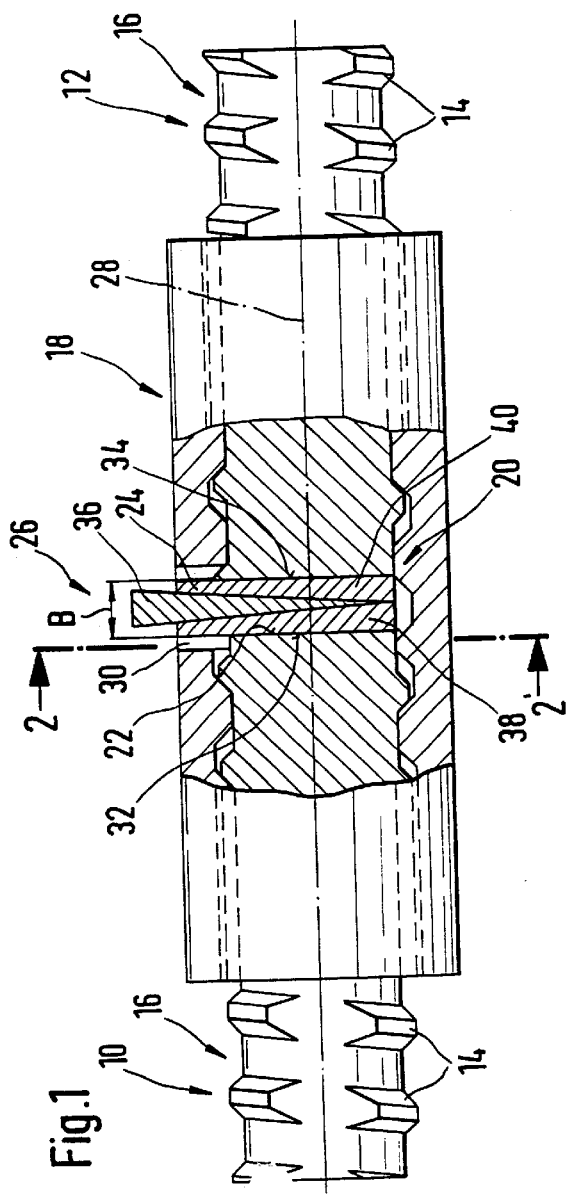
FIG. 1 is a side view, partially drawn as a section, of a sleeve connection according to the invention.

The sleeve connection shown in FIG. 1 connects the ends of two reinforcing rods 10, 12 opposite each other. Both reinforcing rods 10, 12 have ribs 14, which are rolled on in the form of an external thread 16. A threaded sleeve 18 has a continuous channel, which incorporates an internal thread 20, in the longitudinal direction. The two rod ends 10, 12 are screwed into the threaded sleeve 18 in such a way that their end faces 22, 24 are axially opposite each other in the continuous channel of the threaded sleeve 18.

As the external thread 16 of the rods 10, 12 can be rolled only with relatively rough tolerances, but the slip in the sleeve connection under service load must not be greater than 0.1 mm according to DIN 1045, slip limitation must be provided.

The required slip limitation is achieved in the sleeve connection 10 according to the invention by driving a cotter 26 through a lateral opening 30 in the threaded sleeve 18 between the two end faces 22, 24 of the rod ends 10, 12. This cotter 26 bears on the two end faces 22, 24 opposite each other in order to force the two rod ends in the threaded sleeve 18 apart by the wedge effect and thus press the teeth of the external thread 16 of each of the two rod ends 10, 12 axially with a high force against the teeth of the internal thread 20. In other words, the cotter 26 bears indirectly via the rod 12 on the threaded sleeve 18 in order to press the teeth of the external thread 16 of the rod 10 axially against the teeth of the internal thread 20 by the wedge effect. In other words, the cotter 26 bears indirectly via the rod 10 on the threaded sleeve 18 in order to press the teeth of the external thread 16 of the rod 12 axially against the teeth of the internal thread 20 by the wedge effect.

With tensile loading of the prestressed sleeve connection the tensile stresses are accordingly transmitted from rod to rod via the threaded sleeve 18 without axial play. With compressive loading of the prestressed sleeve connection the compressive stresses are transmitted directly from rod to rod via the cotter 26 without axial play.

Figure 2:
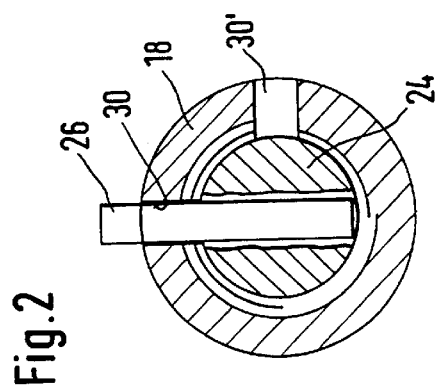
FIG. 2 a cross-section along the section line 2–2' through the sleeve connection in FIG. 1.
Figure 3:
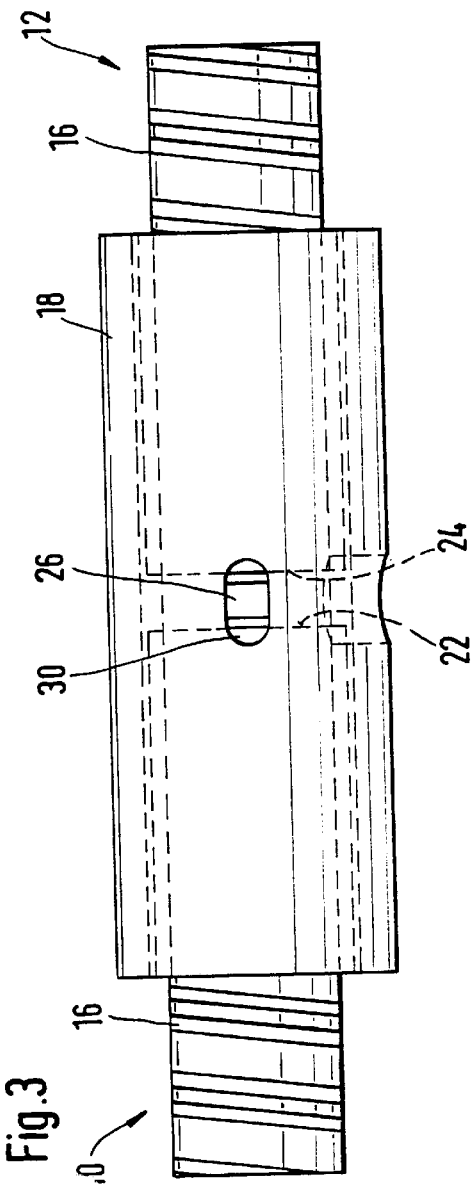
FIG. 3 a plan view of the sleeve connection in FIG. 1.

The cotter 26 shown in FIGS. 1 to 3 is a three-part wedge, which bears with parallel supporting faces 32,34 on the end faces 22, 24 of the rods 10, 12 at right angles to the longitudinal axis. It is formed by three complementary wedge elements 36, 38, 40, which are combined to form a type of drive-in dowel. The three wedge elements 36, 38, 40 may be held together e.g. by a thin plastic sleeve (not shown) or an adhesive foil or a synthetic resin. The two lateral wedge elements 38, 48 between the end faces 22, 24 of the rods 10, 12 are forced apart by knocking in the middle wedge element 36. One or more marks on the middle wedge element permit clear determination of the driving depth.

As shown inter alia in FIG. 3, the opening 30 in the threaded sleeve 18 is formed as a guide slot for the cotter 26, in which the cotter 26 is guided laterally. FIG. 2 shows that the threaded sleeve 18 has a second guide slot 30' for the cotter 26, which is offset by about 90° from the first guide slot 30 in the circumferential direction. Depending on the angular positions of the threaded sleeve 18, either the guide slot 30 or the guide slot 30' is more easily accessible for driving the cotter 26.

Figure 4:
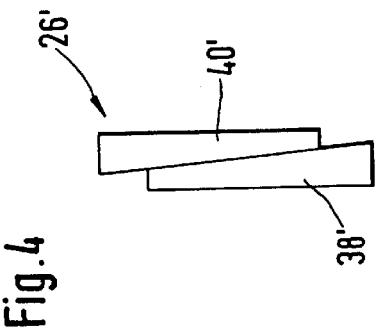
FIG. 4 a side view of an alternative embodiment of a cotter.

FIG. 4 shows an embodiment of the cotter as a double wedge 26' consisting of two complementary wedge elements 38', 40'. Compared to the three-part wedge 26 in FIGS. 1 to 3, however, the double wedge 26' has the disadvantage that at least one of the two wedge elements 38', 40' must slide past the end face 22, 24 of one of the rods 10, 12 when the cotter is knocked in. In this case there is a risk that this wedge element 38', 40' will cut a groove in the softer end face 22, 24 when the cotter is knocked in, with the result that the prestressing achieved is, of course, reduced. This risk is largely precluded with the three-part wedge 26 in FIGS. 1 to 3, because the middle wedge element 36 to be driven is guided between the outer wedge elements 38, 40 and is not in direct contact with the end faces 22, 24 of the rods 10, 12. It should be noted that the double wedge in FIG. 4 could also be driven through two openings opposite to each other in the threaded sleeve 18, i.e. from two sides.

The sleeve connection shown in FIGS. 1 to 3 can be made, for example, in the following way. The threaded sleeve 18 is screwed fully on to the first rod 10. The second rod 12 is subsequently arranged in an axial extension of the rod 10 in such a way that the axial distance between the two end faces 22, 24 is slightly larger than the initial width "B" of the cotter 26. A suitable gauge is advantageously available on the construction site to adjust this distance. The sleeve is subsequently screwed back over the connection until the end face 22 of the rod 10 becomes visible in the opening 30 of the threaded sleeve 18 (the end face 24 of the rod 12 is still concealed on the right of the opening 30). The three-part wedge 26 is now inserted by hand in the opening 30. Its bottom end should rest on the inner wall of the threaded sleeve 18 in a position diametrally opposed to the opening 30. If necessary a slot-type seat for the bottom end of the three-part wedge 26 can be incorporated in the wall of the threaded sleeve 18. The rod 12 is subsequently screwed further into the threaded sleeve 18 until its end face 12 bears on the cotter 26. The initial distance between the two end faces 22, 24 should preferably be selected in such a way that a quarter revolution of the rod 12 is adequate to establish contact with the cotter 26. The screwing in of the rod 12 also ensures inter alia that the axial play is distributed between the tooth flanks of the external and internal thread 16, 20 to the right in the case of the left-hand rod 10 and to the left in the case of the right-hand rod 12. It is now checked through the opening 30 in the threaded sleeve 18 whether the two end faces 22, 24 in fact lie flush with the cotter 26 before the middle wedge element 26 is knocked in as far as the corresponding mark. The width "B" of the cotter 26 increases, so that the two rods 10, 12 are forced apart. In this case the right-hand tooth flanks of the rod 12 are pressed with high force against the left-hand tooth flanks of the threaded sleeve 18 and the left-hand tooth flanks of rod 10 with high force against the right-hand tooth flanks of the threaded sleeve 18. In other words the screwed connection is prestressed by driving in the cotter 26. The depth of penetration of the middle wedge element 26 determines the prestressing load achieved with the cotter 26.

If irregularities are present in the rolled-on external thread 16 of the rods 10, 12, only a few teeth of the external thread 16 are in contact with the teeth of the internal thread 20 before the prestressing and the contact area of the thread teeth is relatively reduced. Plastic deformations of the softer teeth of the threaded sleeve 18 occur during prestressing, with the result that further teeth of the external thread 16 come into contact with teeth of the internal thread 20 and the contact area of the thread teeth increases. In other words individual thread teeth and contact areas are plastically deformed during the prestressing, so that a larger area between the external and internal threads is available from the outset for transmission of the service load in the screwed connection. Consequently it is ensured that when the service load is applied, primarily elastic, i.e. reversible, deformations take place in the screwed connection.

Figure 5:
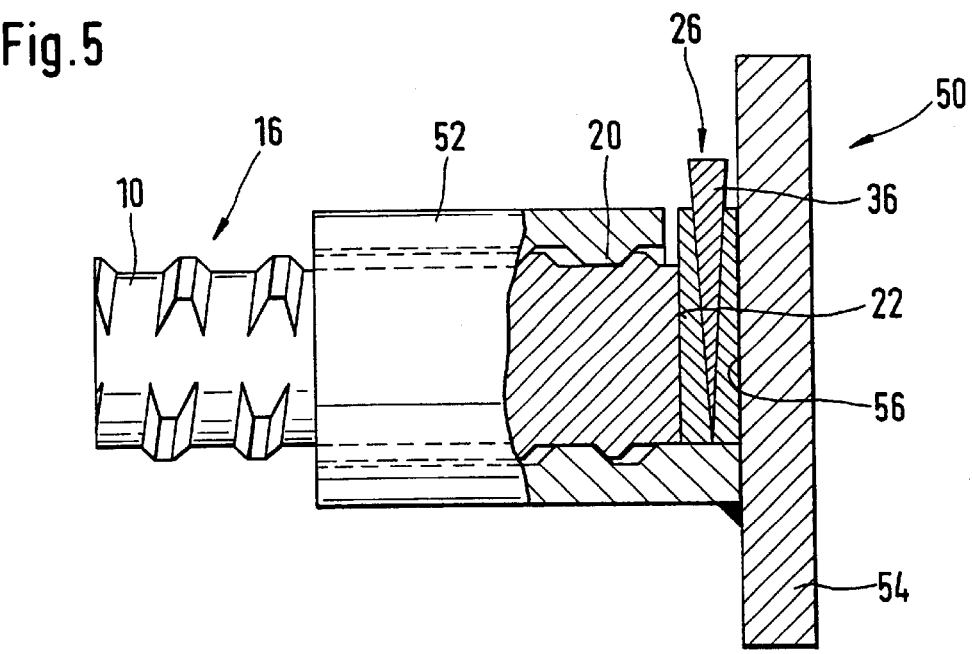
FIG. 5 a side view, partially as a section, of an end anchorage according to the invention.

The securing of an end anchorage 50 with a screwed connection according to the invention to a rod end 10 is shown in FIG. 5. The end anchorage 50 consists essentially of a threaded sleeve 52 or cap nut, on to which an anchor plate 54 is welded at the end. The cotter 26 is driven through a lateral opening 30 in the threaded sleeve 52 at right angles to the longitudinal axis of the threaded sleeve 52 in such a way that it bears on the end face 22 of the rod end 10 and on the threaded sleeve 52 via an opposite supporting area 56 in order to press the external and internal threads 16, 20 axially against each other by the wedge effect. In the embodiment shown, the supporting area 56 of the cotter 26 is formed by the anchor plate 54 of the threaded sleeve 52.

The end anchor 50 can advantageously be secured in the following way. The end anchor 50 is screwed with the inserted cotter 26 on to the rod 10 until the end face 22 of the rod 10 bears on the cotter 26 and presses the latter against the supporting area 56. The position of the cotter 26 can be visually checked through the opening 30. The middle wedge element 36 of the cotter 26 is subsequently knocked in to prestress the screwed connection as in the sleeve connection described above.

Figure 6:
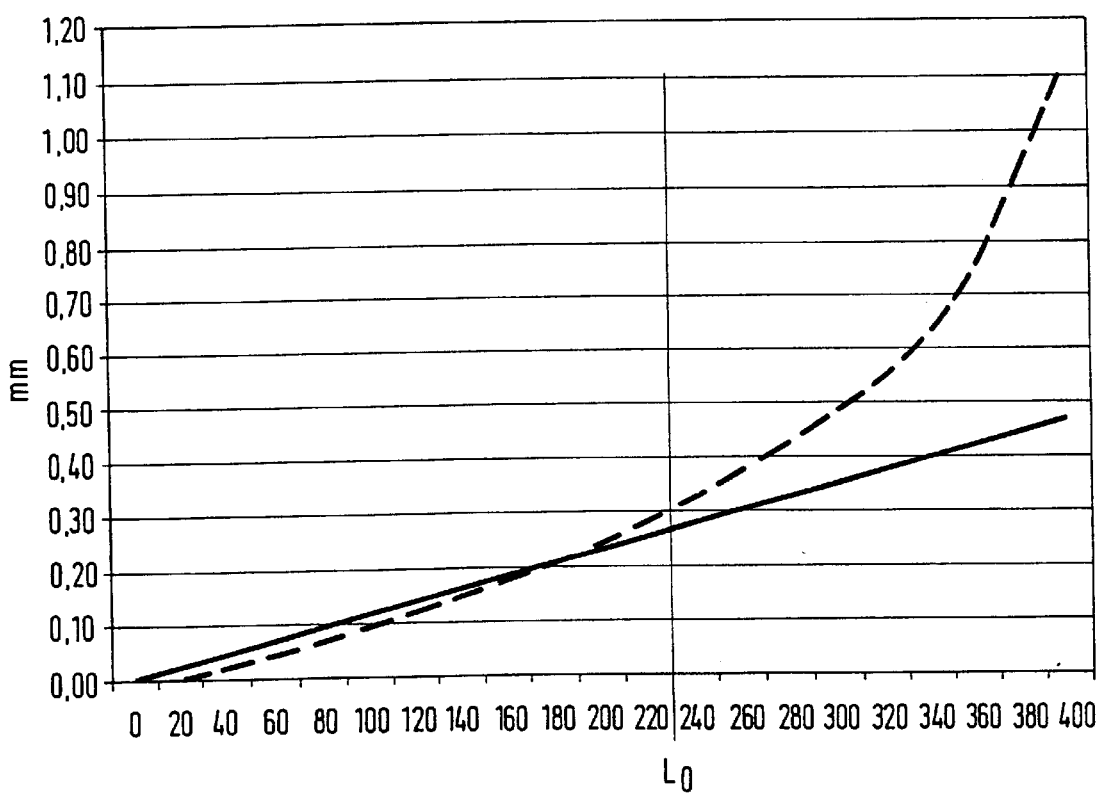
FIG. 6 a tension/strain diagram, in which the strain behaviour of a sleeve connection according to the invention is shown.

The strain behaviour of a sleeve connection according to the invention as shown in FIG. 1 under tensile load is shown in a diagram in FIG. 6. The nominal diameter of the connected threaded rods 10, 12 is 32 mm. In the diagram the dashed curve represents the load-dependent strain of the sleeve connection according to the invention. The continuous straight line represents the load-dependent strain of a continuous threaded rod with a nominal diameter of 32 mm. With the same load the strain of the sleeve connection is initially slightly smaller than that of the threaded rod, because the material cross-section in the threaded sleeve 18 is larger. With increasing tensile load, however, plastic deformation of the thread teeth of the threaded sleeve 18 slowly becomes noticeable, so that the strain curve of the sleeve connection slowly becomes steeper. With a service load Lo of 230 kN the sleeve connection according to the invention is, however, only about 0.03 mm longer than the corresponding reference rod. This slip value of 0.03 mm is still substantially smaller than the maximum value of 0.1 mm specified in DIN 1045. A slip value greater than 0.1 mm is achieved only under a stress of about 280 kN.

It should be noted that the cotter can easily be knocked in with a 0.5 kg hammer for prestressing the screwed connection according to the invention with a nominal diameter of 32 mm. If lock nuts are used, a locking torque of more than 1600 Nm would have to be produced to ensure the same prestressing. By contrast a locking torque of this magnitude can hardly be produced by a manual torque wrench.

What is claimed is:

1. A screwed connection comprising:
   at least one rod end with an external thread;
   a threaded sleeve with an internal thread, which is screwed on to the external thread of the rod end;
   a cotter having a wedge producing characteristic, which cotter is driven through a lateral opening in the threaded sleeve in such a way that it bears on the threaded sleeve and on the end face of the rod end, wherein said cotter presses the external and internal thread axially against each other by a wedge effect produced by the wedge producing characteristic of said cotter.

2. A screwed connection comprising:
   at least one rod end with an external thread;
   a threaded sleeve with an internal thread, which is screwed on to the external thread of the rod end;
   a cotter, which is driven through a lateral opening in the threaded sleeve in such a way that it bears on the threaded sleeve and on the end face of the rod end in order to press the external and internal thread axially against each other by the wedge effect, and wherein the cotter is a double wedge with parallel bearing surfaces.

3. The screwed connection according to claim 2, wherein the cotter has a mark for the driving depth.

4. A screwed connection comprising:
   at least one rod end with an external thread;
   a threaded sleeve with an internal thread, which is screwed on to the external thread of the rod end;
   a cotter, which is driven through a lateral opening in the threaded sleeve in such a way that it bears on the threaded sleeve and on the end face of the rod end in order to press the external and internal thread axially against each other by the wedge effect, and wherein the coffer is a three-part wedge with parallel bearing surfaces.

5. The screwed connection according to claim 4, wherein the cotter has a mark for the driving depth.

6. The screwed connection according to claim 4, wherein the three-part wedge is designed as a one-piece drive-in dowel.

7. The screwed connection according to claim 1, wherein the opening in the threaded sleeve is designed as a guide slot, in which the cotter is guided laterally.

8. The screwed connection according to claim 1, wherein the threaded sleeve has at least two openings offset in the circumferential direction.

9. The screwed connection according claim 1, wherein the rod end is part of a reinforcing rod, said reinforcing rod having an external thread rolled thereon over its whole length.

10. A sleeve connection comprising:
    a threaded sleeve that has a continuous channel with an internal thread;
    a first and a second rod end with a rolled-on external thread, said rods being screwed into said threaded sleeve in such a way that their end faces are axially opposite each other in the threaded sleeve; and
    a cotter having a wedge producing characteristic, which cotter is driven into a lateral opening in the threaded sleeve between the two end faces of the rod ends in such a way that it bears on these two end faces, wherein said cotter presses the external thread of the two rod ends axially against the internal thread of the threaded sleeve by a wedge effect produced by the wedge producing characteristic of said cotter.

11. The sleeve connection according to claim 10, wherein the cotter is a double wedge with parallel bearing surfaces.

12. The sleeve connection according to claim 10, wherein the cotter is a three-part wedge with parallel bearing surfaces.

13. The sleeve connection according to claim 3, wherein the three-part wedge is designed as a one-piece drive-in dowel.

14. The sleeve connection according to claim 10, wherein the opening in the threaded sleeve is designed as a guide slot, in which the cotter is guided laterally.

15. The sleeve connection according to claim 10, wherein the threaded sleeve has at least two openings offset in the circumferential direction.

16. An end anchorage comprising:

a rod end with a rolled-on external thread;

a threaded sleeve with an internal thread screwed onto the external thread of the rod end, said threaded sleeve comprising an end anchorage means; and a cotter having a wedge producing characteristic, which cotter is driven into a lateral opening of the threaded sleeve in such a way that it bears on the end face of the rod end and on the threaded sleeve, wherein said cotter presses the external and internal threads axially against each other by a wedge effect produced by the wedge producing characteristic of said cotter.

17. An end anchorage comprising:

a rod end with a rolled-on external thread;

a threaded sleeve with an internal thread screwed onto the external thread of the rod end, said threaded sleeve comprising an end anchorage means; and a cotter that is driven into a lateral opening of the threaded sleeve in such a way that it bears on the end face of the rod end and on the threaded sleeve in order to press the external and internal threads axially against each other by the wedge effect, and wherein the cotter is a double wedge with parallel bearing surfaces.

18. An end anchorage comprising:

a rod end with a rolled-on external thread;

a threaded sleeve with an internal thread screwed onto the external thread of the rod end, said threaded sleeve comprising an end anchorage means; and a cotter that is driven into a lateral opening of the threaded sleeve in such a way that it bears on the end face of the rod end and on the threaded sleeve in order to press the external and internal threads axially against each other by the wedge effect, and wherein the cotter is a three part wedge with parallel bearing surfaces.

19. The end anchorage according to claim 18, wherein the three-part wedge is designed as a one-piece drive-in dowel.

20. The end anchorage according to claim 16, wherein the opening in the threaded sleeve is designed as a guide slot, in which the cotter is guided laterally.

21. The end anchorage according to claim 16, wherein the threaded sleeve has at least two openings offset in the circumferential direction.

* * * * *